(No Model.)

J. COCHRAN.
COFFEE POT.

No. 285,972. Patented Oct. 2, 1883.

WITNESSES
Wm A. Skinkle
Jos. S. Latimer

INVENTOR
James Cochran,
By his Attorneys
Pope Edgecomb & Butler

United States Patent Office.

JAMES COCHRAN, OF NEW LOTS, ASSIGNOR TO THE LALANCE & GROSJEAN MANUFACTURING COMPANY, OF NEW YORK, N. Y.

COFFEE-POT.

SPECIFICATION forming part of Letters Patent No. 285,972, dated October 2, 1883.

Application filed June 4, 1883. (No model.)

*To all whom it may concern:*

Be it known that I, JAMES COCHRAN, a citizen of the United States, and a resident of New Lots, in the county of Kings and State of New York, have invented certain new and useful Improvements in Coffee-Pots, of which the following is a specification.

My invention comprises certain improvements in the organization of vessels for preparing coffee as a beverage by infusion; and its object is the provision of improved means for combining and manipulating the parts of such vessels, hereinafter particularly described and claimed.

Figure 2:
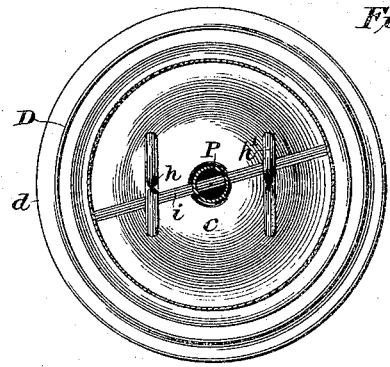
Figure 1:
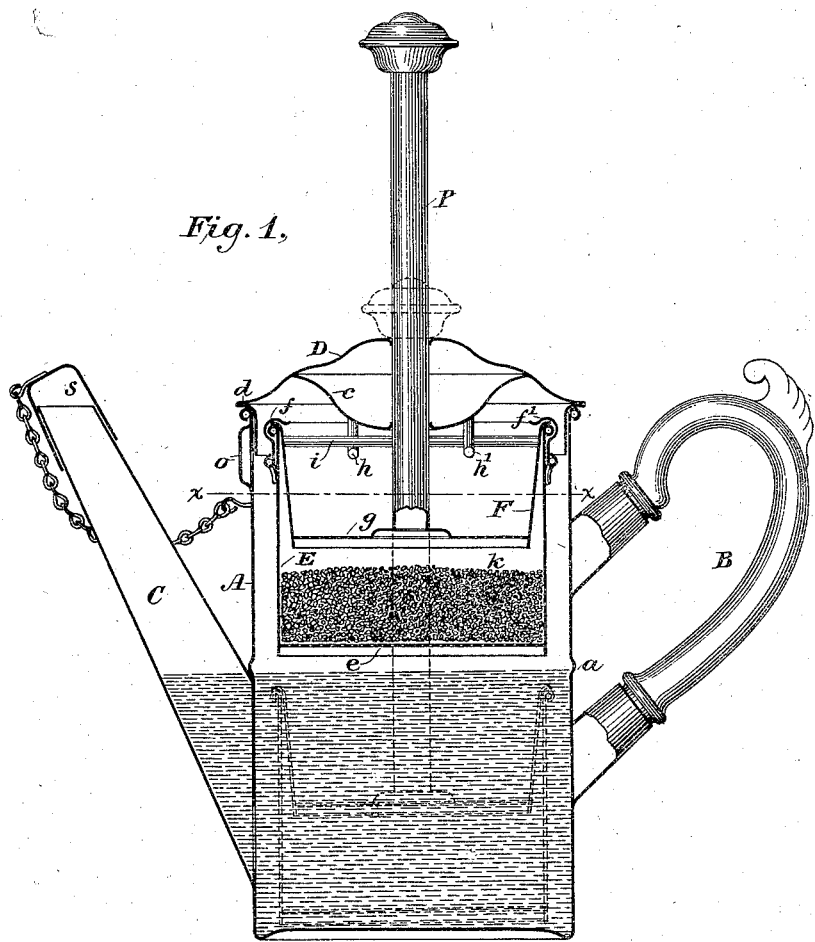

My invention is illustrated in the accompanying drawings, in which Figure 1 is a transverse vertical section of a coffee-pot embodying my invention, and Fig. 2 is an inverted sectional plan view thereof, taken on the line X of Fig. 1.

In the drawings, A represents the body of the coffee-pot, which is preferably formed of sheet metal, and which is provided with the usual handle, B, and spout C. A cover, D, slightly conical in shape, and having a conical strengthening-piece, $c$, soldered to its under side, is provided for the vessel. Two pairs of L-shaped hooks, $h\ h'$, are secured to the inner side of the cover in such manner that each pair, when properly secured in place, conform to the shape of an inverted T. A cup, E, which may also preferably be made of sheet metal, and which is provided with a finely-perforated or sieve-like bottom, $e$, is formed to fit concentrically within the body A, and is suspended within the upper portion of the latter in a manner hereinafter explained. Another cup, F, of less depth than the cup E, and also having a finely-perforated or sieve-like bottom, is arranged to fit within the cup E, its flanged upper edge overlapping the corresponding edge of the latter, so as to completely close the mouth of the cup E. The cups are united by means of two hinged spring-clamps, $f\ f'$, which fit over the rim of the cup F, as shown, and thus firmly hold the cups E and F together. A rod or plunger, P, is soldered or otherwise rigidly secured to the bottom $g$ of the cup F, and extends vertically through apertures in the cover D and piece $c$, having a free vertical movement therein. A stiff wire or rod, $i$, is soldered at its ends to the edges of the inner cup, F, and extends diametrically across the same and passes through the plunger, to which it is also soldered. The cups E and F being secured together by means of the clamps $f$ and $f'$, and drawn up to the top of the body A by means of the plunger, they may be suspended in such position by turning the loosely-mounted plunger P until the rod $i$ engages with one of each of the pair of hooks $h\ h'$. An orifice, $o$, which may preferably be in the form of a small steam-whistle, is formed in the side of the body A, near its top, for permitting the escape of steam and indicating the progress of the preparation of the coffee, as hereinafter explained.

The manner in which the coffee-pot above described is practically utilized is as follows: The cups E F, with the plunger P and cover D, having been removed, thus leaving the body A empty, water is poured therein, care being taken that it does not rise above the corrugation $a$. The cups E and F having been separated, a proper amount of coffee-grains, which have previously been finely pulverized, are placed within the cup E, as indicated at $k$ in Fig. 1. The cup F is next placed within the cup E, and the two are united by means of the clamps $f\ f'$, as hereinbefore described. The cover D, being loosely supported upon the plunger P, is next allowed to descend until it rests upon the rim of the cup F. The cover D, plunger P, and cups E and F are then placed within the body A, and the cover D, by means of its flanges $d$ and $d'$, tightly closing the vessel. While the cover D is being secured in place the cups E and F should be suspended above the water by turning the plunger P in either direction until stopped by the contact of the rod or wire $i$ with the hooks $h\ h'$, upon which latter the wire may be allowed to rest, as shown in the drawings. The parts having been secured in position, as described, the vessel, with its contents, is placed upon a stove or other generator of heat, and its parts are allowed to remain in the relative position last described until the water boils, which will be indicated by the steam arising therefrom through the orifice $o$, which latter, if constructed in the form of a steam-whistle, as before intimated, will, by the steam passing through it, audibly indicate the escape of steam and ebullition of the water. A part of the steam arising from the water passes through the perforated bottom of the cup E, thoroughly impregnates the coffee-grains, and more properly prepares the latter for the infusion afterward to take place. Soon after the steam has begun to escape, the vessel should be removed from the fire, the wire $i$ detached from the hooks $h$ and $h'$ by turning the rod or plunger P, and the cups E and F (the latter containing the pulverized coffee-grains) allowed to descend into the boiling water, as indicated in dotted lines in Fig. 1. After a few minutes infusion of the coffee-grains, the cups may be again suspended by means of the hooks, and the preparation of the liquid coffee thus formed in the lower portion of the vessel will be completed. During the preparation of the coffee, as above described, the mouth of the spout C should be closed by means of the stopper $s$, in order to prevent the escape of steam through the spout.

I claim as my invention—

1. In a coffee-pot, the combination of a main body for containing the liquid, a cover therefor, a cup supported therein and provided with a finely-perforated or sieve-like bottom, and the double hooks $h\ h'$, secured to said cover, whereby said cup may be suspended above the water, substantially as set forth.

2. In a coffee-pot, the combination of a main body for containing the liquid, a cover therefor, a cup supported therein and provided with a finely-perforated or sieve-like bottom, a detachable cover for said cup, and the double hooks $h\ h'$, secured to said cover, whereby said cup may be suspended, substantially as set forth.

3. In a coffee-pot, the combination of the cups E and F, having perforated bottoms, the clamps $f\ f'$, rod $i$, and double hooks $h\ h'$, substantially as set forth.

4. In a coffee-pot, the combination, with the cups E F and rod $i$, of the cover D, plunger P, and double hooks $h\ h'$, secured to said cover, substantially as set forth.

5. The combination of the body A of a coffee-pot, cups E and F, having perforated bottoms, the clamps $f\ f'$, the plunger P, secured to cup F, rod $i$, cover D, and hooks $h\ h'$, whereby said cups may be suspended above the water contained in said body, substantially as set forth.

In testimony whereof I have hereunto subscribed my name this 2d day of June, A. D. 1883.

JAMES COCHRAN.

Witnesses:
DANIEL W. EDGECOMB,
CARRIE E. DAVIDSON.